May 30, 1944. J. A. HARRINGTON 2,350,229
SURFACE GRINDER AND AUTOMATIC CONTROL MEANS THEREFOR
Filed Nov. 27, 1942 4 Sheets-Sheet 3

Inventor
John A. Harrington
By
Attorney

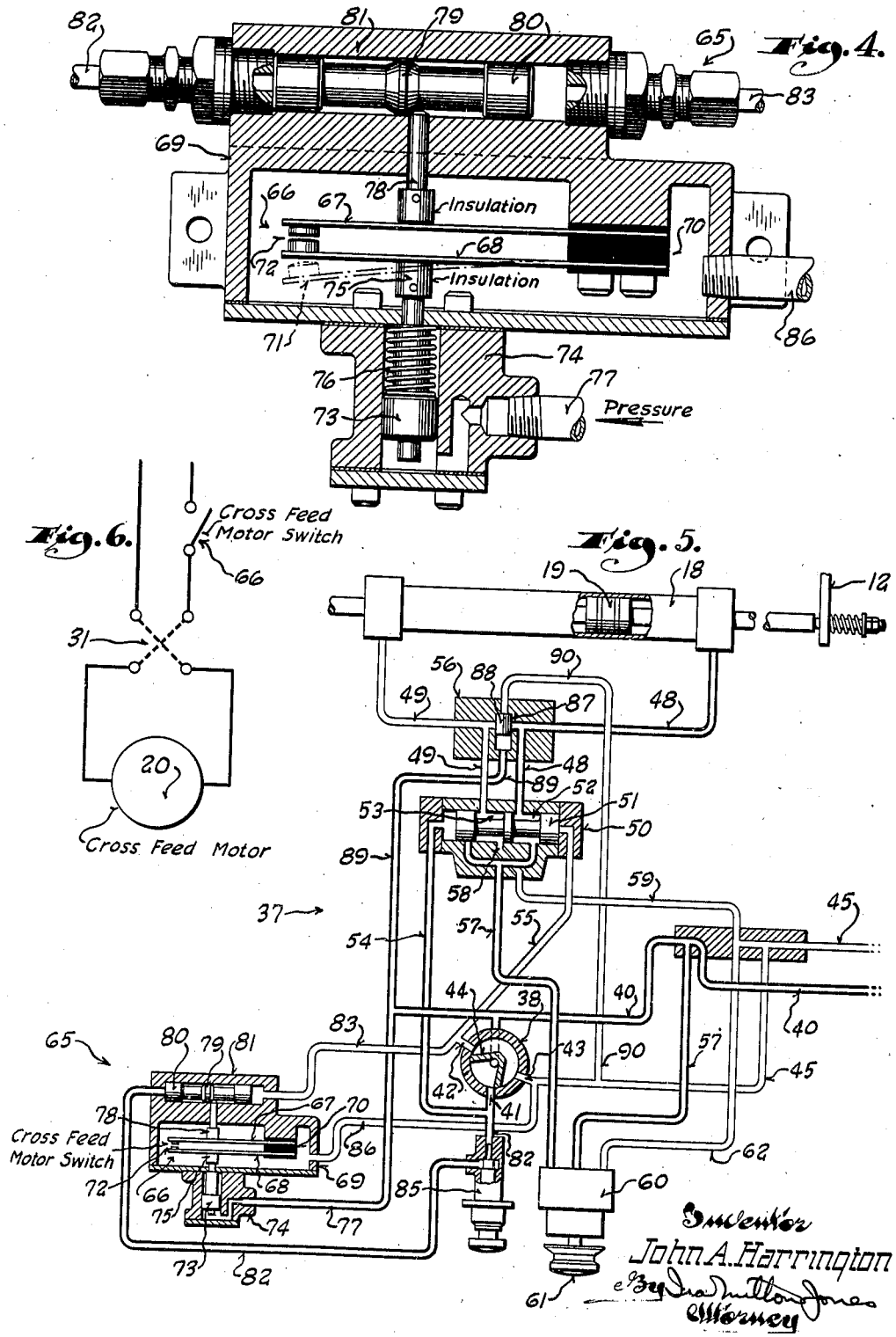

Patented May 30, 1944

2,350,229

UNITED STATES PATENT OFFICE 2,350,229

SURFACE GRINDER AND AUTOMATIC CONTROL MEANS THEREFOR

John A. Harrington, Minneapolis, Minn., assignor to Continental Machines, Incorporated, Minneapolis, Minn., a corporation of Minnesota Application November 27, 1942, Serial No. 467,077

10 Claims. (Cl. 51—233)

This invention relates to metal working machines and refers more particularly to surface grinders of the type having a reciprocatory work supporting table carried by a saddle which is also mounted for reciprocatory motion but in a direction crosswise to travel of the work table. In surface grinders of this type, the saddle is adapted to be intermittently advanced with an indexing cross-feed motion in timed relation to reciprocation of the work table to effect progressive engagement of a piece of work on the table with a grinder operating in a relatively fixed working zone.

In the past, it has been customary to provide manually operated controls for not only reciprocating the work table but also for imparting indexing motion to the saddle at each extreme of reciprocatory movement of the table. Obviously, this required the attention of an operator at the machine at all times.

Recently, surface grinders having control means functioning to automatically reciprocate the work table and index the saddle have become popular since they demand but a minimum of attention by an operator.

For various reasons these past automatic control systems for surface grinders have been objectionable; some being too costly and complicated, and others being incapable of reliably effecting their intended functions with the precision required of a machine of this type.

It is therefore an object of this invention to provide a surface grinder of the character described with improved control means for automatically effecting reciprocation of the work table and for indexing the saddle in timed relation to reciprocation of the work table.

More specifically, it is an object of the present invention to provide a surface grinder of the character described with an automatic control system wherein the work table is reciprocated by fluid pressure responsive instrumentalities and wherein the indexing of the saddle is controlled by fluid pressure responsive means.

Another object of this invention resides in the provision of a novel timing device for determining the period of operativeness of the power means for advancing the saddle whereby any desired extent of indexing motion may be imparted to the saddle.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 4 is an enlarged cross sectional view of the timing means which governs the operation of the saddle advancing power means;

Figure 5 is a diagrammatic view illustrating the hydraulic system; and

Figure 6 is a diagrammatic view illustrating the manner of reversing the circuit for the cross-feed motor.

Figure 1:
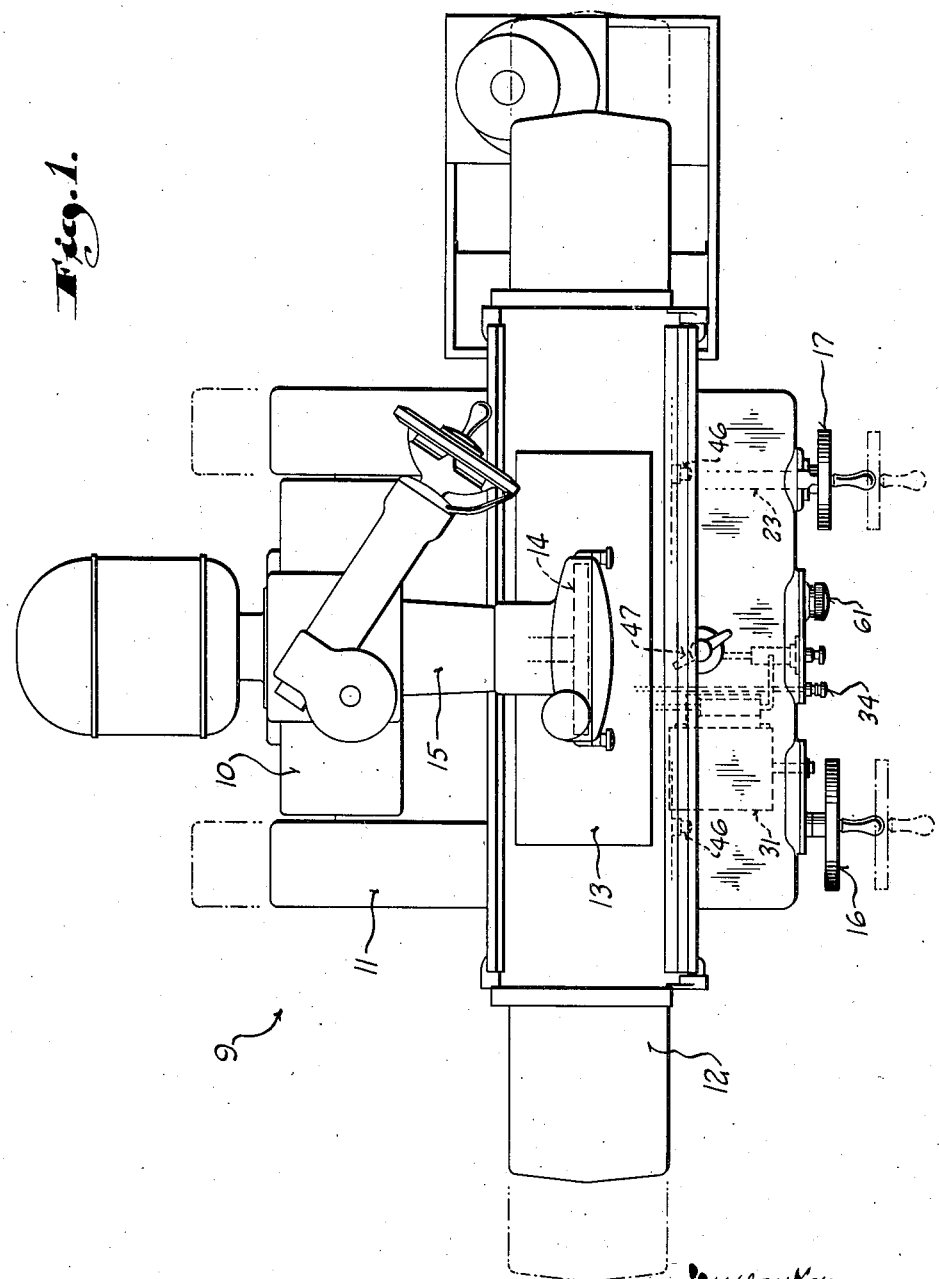
Figure 1 is a plan view of the surface grinder of this invention.
Figure 2:
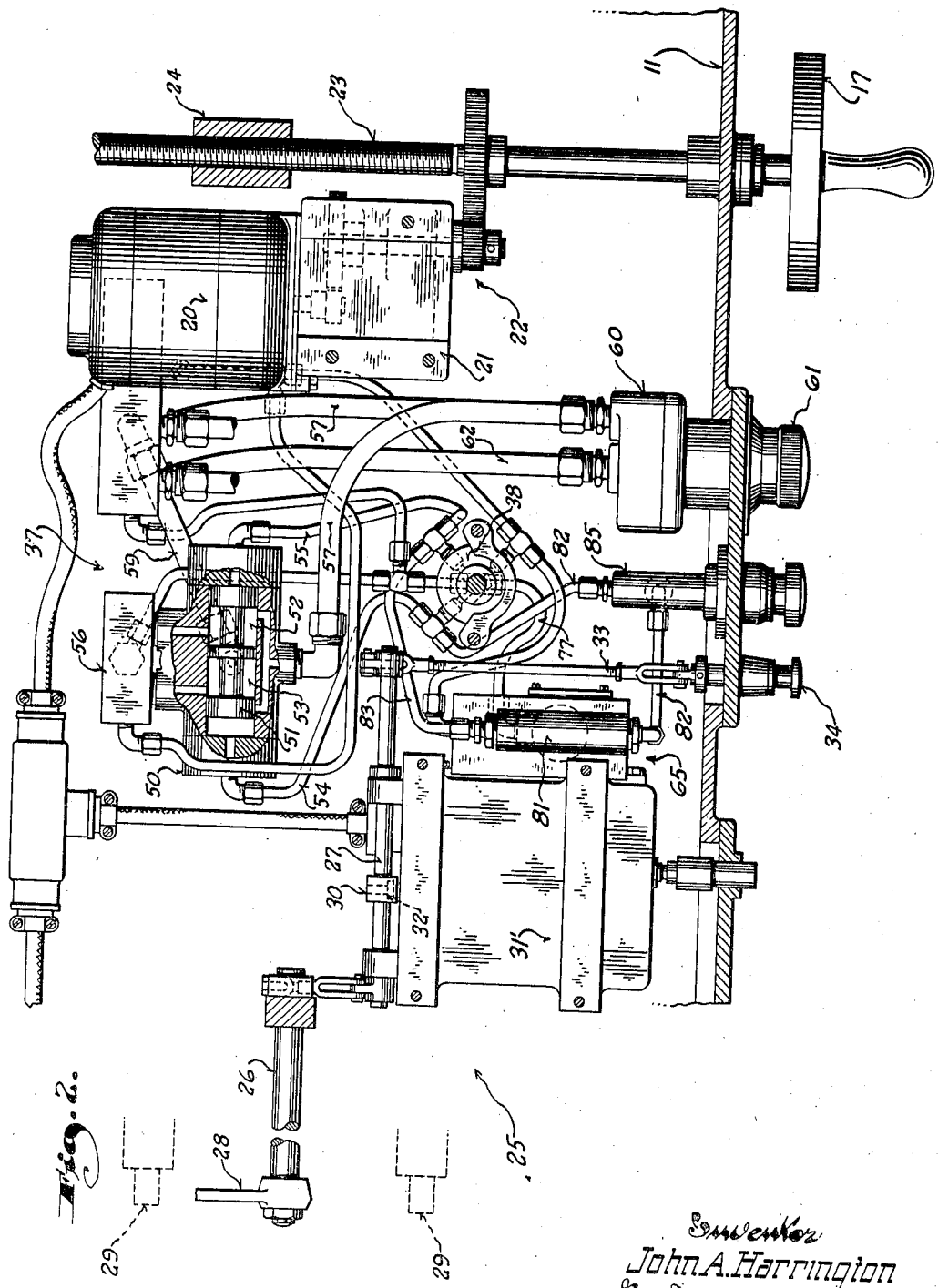
Figure 2 is a plan view illustrating the arrangement of automatic controls for the machine.

Referring now more particularly to the accompanying drawings in which like numerals indicate like parts, it will be seen that the surface grinder 9 is of conventional construction having a base 10 provided with ways (not shown) upon which a saddle 11 is mounted for reciprocatory movement. The saddle 11 is also provided with ways (not shown) to slidably receive the work table 12 to enable reciprocation of the work table lengthwise of the machine but in a direction cross-wise to travel of the saddle.

In the present instance the table is shown provided with a magnetic chuck 13 adapted to secure a piece of work to the table for presentation to the grinding wheel 14 of a grinder head assembly 15 carried by the base 10. Although the grinder head is mounted for vertical adjustment in a well known manner, it may be assumed for convenience that the grinder operates in a relatively fixed working zone through which the work is reciprocated in a manner progressively presenting untreated areas of its surface to the grinder.

In general practice it has been customary to reciprocate the table 12 by means of a hand wheel 16 and to impart cross-feed or indexing motion to the saddle 11 by means of a hand wheel 17 at each extreme of reciprocatory movement of the work table to enable the surface of a piece of work on the chuck 13 to be acted upon progressively by the grinding wheel.

As stated, however, one of the main purposes of this invention is the provision of control means for automatically effecting reciprocation of the work table and intermittent cross-feed advance of the saddle in timed relation to reciprocation of the table.

To this end power means is provided in addition to the manual controls 16 and 17. The power means for reciprocating the work table comprises a double acting hydraulic cylinder 18 (see Figure 5) carried by the saddle 11 and having a piston 19 connected with the table to impart reciprocating movement thereto in correspondence to the flow of fluid into the cylinder. The power means for imparting indexing motion to the saddle includes a reversible electric cross-feed motor 20 secured to the underside of the saddle by a bracket 21. The motor 20 is connected by a gear drive 22 with a screw shaft 23 carried by the saddle 11 and forming part of the manual cross-feed mechanism. Since the screw shaft 23 is threadedly received in a nut member 24 on the base of the machine, it follows that the saddle 11 may be driven in opposite directions crosswise of the work table 12.

Advance of the saddle in either direction by the cross-feed motor is automatically limited by reversing mechanism 25 including a pair of connected shafts 26 and 27 carried by the saddle. A lever 28 on the outer end of the shaft 26 cooperates with adjustable stops or dogs 29 on the base of the machine to swing a lever 30 on the shaft 27 in one direction or the other depending upon the direction of travel of the saddle at the time of engagement of the lever 28 with one of the dogs 29. A motor reversing switch 31 enclosed in an electrical control box 31' fixed to the underside of the saddle has its actuator 32 positioned adjacent to the free end of the lever 30 to be moved thereby during swinging of the lever 30 in one direction to thereby cause reversal of the motor, it being understood that in the absence of a positive motion transmitting connection between the actuator and lever 30, the actuator is biased to a position effecting actuation of the switch during motion of the lever 30 away from the actuator 32.

The shaft 27 is preferably connected through linkage 33 with a manual control button 34 exposed at the front of the saddle so as to be conveniently accessible to an operator of the machine. This enables reversal of the cross-feed motor 20 independently of the automatic reversing mechanism 25.

Both reciprocation of the work table and cross-feed movement of the saddle with an intermittent indexing motion is controlled by a hydraulic system 37 best illustrated in Figure 5. The hydraulic system includes a source of fluid under pressure and a fluid reservoir (not shown) and incorporates a pilot or work table reversing valve 38 mounted on the underside of the saddle, and having a central fluid inlet 39 connected with the fluid pressure source through a pipe line 40, and having radially disposed outlets 41, 42 and 43. A V-shaped rotatable plug 44 is adapted to selectively connect either the outlet 41 or 42 with the inlet 39, and to likewise selectively connect either outlet 41 or 42 with the outlet 43 which connects with the fluid reservoir through a pipe line 45.

The position of the valve plug 44 determines the direction of travel of the piston 19 in its cylinder 18 and consequently the direction of travel of the work table 12, and when oscillated between its two positions effects reciprocation of the work table by alternately connecting the opposite ends of the cylinder 18 with the fluid pressure source.

Oscillation of the plug 44 in this manner is accomplished by means of spaced dogs 46, carried by the side of the work table adjacent to which an operator stands. The dogs 46 are adjustable longitudinally of the table and arranged to individually engage an arm 47 connected with the valve plug 44 to swing the arm and consequently the plug to one of the active positions of the plug substantially at the time the table reaches its extremes of reciprocatory movement.

In the position of the plug shown in Figure 5, the outlet 41 of the valve has been communicated with the inlet 39 thereof by engagement of the right hand dog 46 (see Figure 1) with the arm 47 during movement of the table in the left hand direction, and engagement of the left hand dog 46 with the arm 47 during travel of the table in the right hand direction swings the valve plug from its position indicated in Figure 5 to a position connecting the inlet 39 thereof with the outlet 42. In the position of the plug shown, the outlets 42 and 43 are in communication with the return line 45, while in the other position of the valve, the plug connects the outlets 41 and 43 with the fluid reservoir through the pipe line 45.

While it is possible to connect the pipe lines 48 and 49 leading to the opposite ends of the cylinder 18 with the valve outlets 41 and 42 respectively to accomplish reciprocation of the work table, it is desirable to employ a four-way direction control valve 50 for the purpose of cooperating with the pilot valve in reversing travel of the piston 19 and consequently the table 12. This four-way valve 50 has a spool type piston 51 having two reduced portions providing two axially spaced valve chambers 52 and 53 in the cylinder of the valve.

The ends of the valve cylinder are connected through pipe lines 54 and 55 with the outlets 41 and 42 of the pilot valve 38 respectively, which consequently controls the position of the piston or spool 51 in its cylinder.

In the position of the pilot valve shown, fluid under pressure flows through its outlet 41 and into the left hand end of the cylinder of the four-way valve through the pipe line 54 to hold the piston 51 in a right hand position. In the other position of the pilot valve the piston or spool 51 is moved to its left hand position by the flow of fluid into the right hand end of the valve 50 from the pilot valve outlet 42 and the pipe line 55.

The pipe lines 48 and 49 connected with the opposite ends of the hydraulic cylinder 18 for the work table extend through a by-pass valve 56, the purpose of which will be later described, and lead into the cylinder of the four-way direction control valve 50 at spaced points on one side thereof so that the pipe line 48 always communicates with the valve chamber 52 and so that the pipe line 49 always communicates with the valve chamber 53 regardless of the position of the piston or spool 51.

A pressure line 57 enters the four-way valve 50 at the side thereof opposite the lines 48 and 49 and is branched to communicate with the interior of the cylinder at two spaced points along its length so located with relation to the spool 51 that only one of the pressure inlets and valve chambers are in communication at any one time to correspondingly connect but one of the ends of the hydraulic cylinder 18 with the source of fluid pressure.

In the position of the spool 51 as shown, the valve chamber 52 connects the pipe line 57 leading to the source of fluid pressure with the pipe line 48 leading to the right hand end of the hydraulic cylinder 18 consequently causing travel of the piston 19 to the left in its cylinder 18.

In the opposite position of the spool 51 the pipe line 48 is disconnected from the pressure source by the spool while the valve chamber 53 connects the pipe line 49 leading to the left hand end of the cylinder 18 with the pressure source through the pipe line 57 to thereby cause the piston 19 to travel to the right in its cylinder.

The fluid ahead of the piston 19 is exhausted through either the pipe line 48 or 49 depending upon the direction of piston travel, through an exhaust port 58 entering the cylinder of the valve 50 at a point substantially medially between the branches of the pressure line 57. This port communicates through a pipe line 59 with the exhaust line 45 leading to the reservoir, and the port is so located with respect to the spool 51 as to be connected with the pipe line 49 through the valve chamber 52 during the flow of fluid under pressure through the valve chamber 52 and so as to be connected with the pipe line 48 through the valve chamber 52 during the flow of fluid under pressure through the valve chamber 53.

Inasmuch as it is desirable to control the speed of reciprocation of the work table, the pressure line 57 leading to the four-way direction control valve incorporates a metering valve 60 which is capable of adjustably restricting the flow of fluid through the line 57 so as to afford regulation of the speed of travel of the piston 19 of the hydraulic cylinder 18 and consequently the table speed.

The metering valve 60 forms no part of the present invention and therefore has not been shown in detail, it being sufficient to note that an adjusting knob 61 connected with the stem of the valve projects through the instrument panel at the front of the saddle 11 so as to be conveniently accessible to an operator of the machine; and that in the closed position of the metering valve, fluid is by-passed to the reservoir through a pipe line 62 connecting with the line 45.

Consequently it will be seen that through the hydraulic control instrumentalities described the work table is automatically reciprocated at a speed depending upon the setting of the metering valve 60 and with a stroke depending upon the adjustment of the dogs 46 carried by the work table and located along the front side thereof.

The same pilot or reversing valve 38 in cooperation with a hydraulically operated timing device 65 also controls the operation of the electric cross-feed motor 20 to enable intermittent advance of the saddle 11 with an indexing motion in timed relation to reciprocation of the work table.

Figure 3:
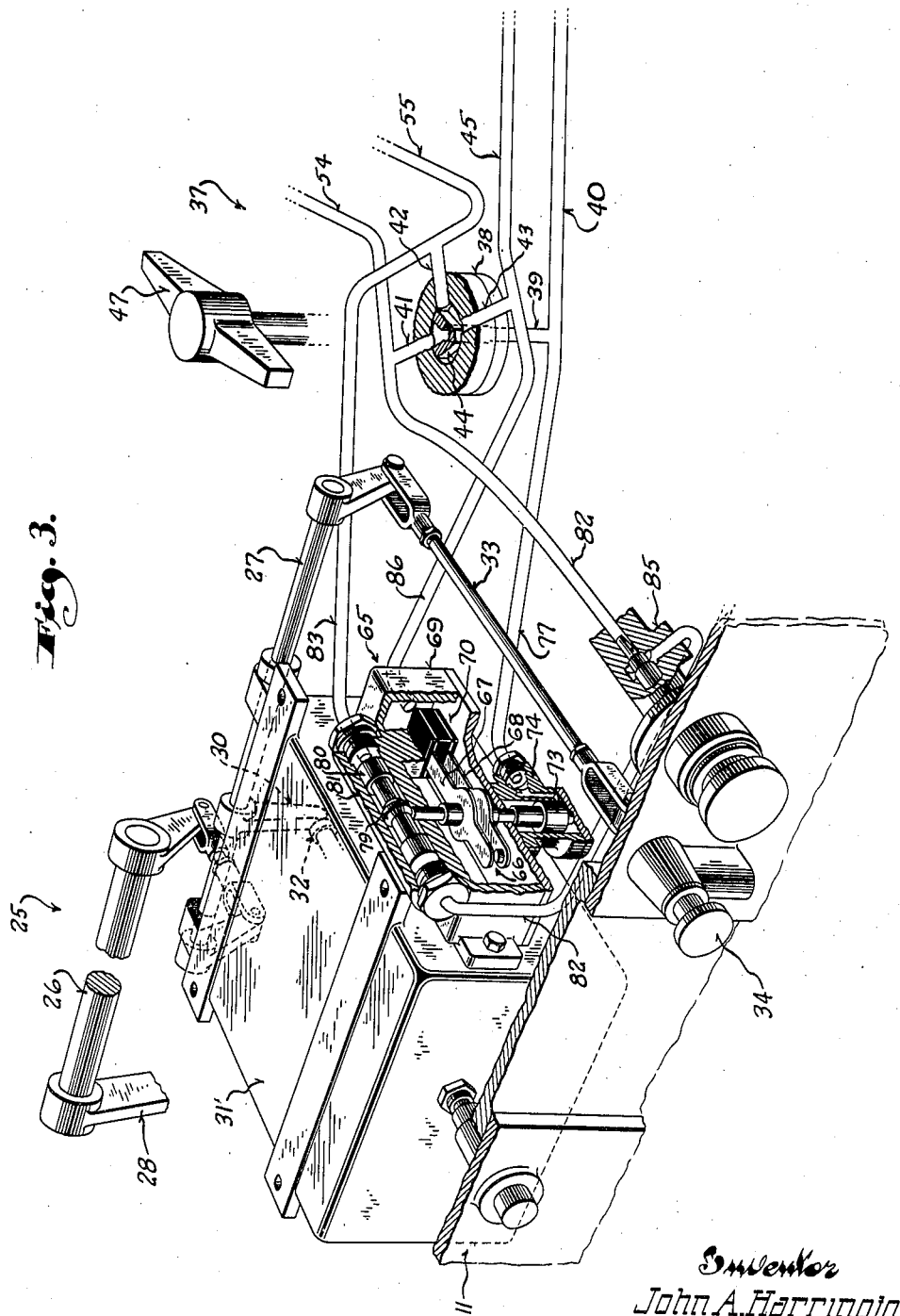
Figure 3 is an enlarged perspective view of a portion of the control system illustrated in Figure 2 having parts thereof broken away and in section to better illustrate the operation of the controls.

The timing device 65 includes an electric switch 66 connected in series with the cross-feed motor reversing switch 31 to govern energization of the cross-feed motor. The switch 66 (as best illustrated in Figures 3 and 4) is comprised of a pair of cooperating switch arms 67 and 68 of resilient metal enclosed in a suitable housing 69 and each having one end fixed as at 70 to the housing in insulated relationship therewith.

The arm 67 is biased to a straight substantially unflexed position as indicated, while the arm 68 extending alongside the arm 67 is biased by its inherent resiliency to a position 71 normally spaced a distance away from the arm 67. Cooperating contacts 72 on the outer free ends of the arms are adapted to be brought into engagement to complete an electric circuit through the reversing switch to the electric motor 20.

A piston 73 slidable in a hydraulic cylinder 74 secured to the housing 69 has a portion 75 projecting into the housing 69 for engagement with the contact arm 68 to control the position thereof. A spring 76 confined between the outer wall of the housing 69 and the adjacent end of the piston 73 yieldingly urges the piston to an inoperative position in which the switch arm 69 is free to assume its dotted line position 71.

The arm 68, however, is maintained in a potentially operative position and in cooperative relationship with the switch arm 67 enabling closure of the switch by subjection of the piston 73 to fluid pressure, and to this end the cylinder 74 is connected with the pressure line 40 through a pipe line 77. The pipe line 77, as clearly illustrated in Figure 4, communicates with the cylinder in a manner such that fluid flowing into the cylinder forces the piston against the action of its spring 76 to its position shown where the portion 75 of the piston holds the switch arm 68 in a position enabling closure of the switch.

Closure of the switch 66 is effected upon depression of the switch arm 67 toward the arm 68 to engage the contacts 72, and for this purpose a plunger 78 is provided to be actuated by a cam surface 79 formed on a piston 80 reciprocable in a hydraulic cylinder 81 formed as a part of the switch housing 69.

The opposite ends of the hydraulic cylinder 81 are connected with the outlets 41 and 42 of the pilot or reversing valve 38 through pipe lines 82 and 83 respectively so that the flow of fluid under pressure into the cylinder is under the direct control of the pilot valve.

Referring to Figure 5 it will be seen that the position of the pilot valve 38 is such as to connect the left hand end of the hydraulic cylinder 81 with the source of fluid pressure so as to cause movement of the piston 80 in the right hand direction. During motion of the piston 80 to the right, the cam surface 79 depresses the plunger 78 and holds the contacts 72 of the switch 66 engaged for a length of time depending upon the speed of travel of the piston. Obviously, the cross-feed motor will also be rendered operative for a period of time depending upon the duration of engagement of the contacts 72.

The speed at which the piston 80 traverses its cylinder in response to fluid pressure is adjustable to any desired degree by means of a metering valve 85 positioned in the pipe line 82 to regulate the flow of fluid therethrough. The extent of restriction of the flow of fluid through the pipe line 82 by means of the metering valve 85, as will be apparent, proportionately affects the pressure which is relied upon to reciprocate the piston 80 and enables closure of the switch for any predetermined period of time to cause an indexing advance of the saddle for any desired distance.

As will readily be apparent, however, reciprocation of the piston 80 in response to the alternate application of fluid pressure to its ends results in intermittent operation of the cross-feed motor only because of the fact that the switch arm 68 is held in its potentially operative position by the portion 75 on the piston 73.

Although at the time of manual operation of the machine the hydraulic system is maintained inoperative, vibration may possibly effect momentary engagement of the switch contacts 72 in the absence of a safety device which would prevent such accidental operation of the cross-feed motor. The hydraulic cylinder 74 and its piston 73—75 constitutes such a safety device inasmuch as in the absence of fluid pressure, it permits flexure of the switch arm 68 to a position well outside the range of motion of the movable contact arm 67 thereby disrupting the cooperative relationship between the switch arms.

A pipe line 86 connecting the interior of the switch housing 69 with the return line 45 provides for the exhaustion of any fluid which might leak into the switch housing.

The by-pass valve 56 hereinbefore mentioned facilitates manual operation of the machine and permits such operation without necessitating disconnection of the piston 19 from the work table. This valve has a cylinder 87 in which a piston 88 operates. The pipe lines 48 and 49 connect with the cylinder 87 at opposite sides thereof, but during automatic control of the machine, the piston 88 occupies a position preventing communication between the opposite ends of the cylinder 18 through the lines 48 and 49. The piston is maintained in such a position by fluid pressure, and to this end the bottom of the cylinder 87 is communicated with the pressure line 40 through a branch line 89. The opposite end of the cylinder 87 is communicated with the return line 45 through a branch 90 thereof so that any fluid leaking past the piston may be exhausted from the cylinder.

When the fluid pressure system is shut down for manual operation of the machine, the piston 88 drops to the bottom of its cylinder establishing direct communication between the pipe lines 48 and 49 connected with the opposite ends of the table cylinder 18.

From the foregoing description taken in connection with the accompanying drawings, it will be readily apparent to those skilled in the art that this invention provides an improved automatic control means for effecting reciprocation of the work table of a surface grinder and wherein the same hydraulic system for operating the work table is utilized to control the automatic indexing advance of the saddle in timed relationship with reciprocation of the table.

What I claim as my invention is:

1. In a metal working machine of the type having a base, a saddle mounted for reciprocatory movement on the base, and a work supporting table mounted for reciprocatory movement on the saddle but in a direction crosswise to the direction of saddle motion, means for automatically advancing the saddle with an intermittent indexing motion in timed relation to reciprocatory movement of the work table to thereby enable the surface of a piece of work on the table to be acted upon progressively by a tool operating in a relatively fixed working zone, comprising: power means for advancing the saddle including an electric motor; a normally open switch for connecting the motor with a source of E. M. F.; switch actuating means movable when subjected to fluid pressure to momentarily close said switch for a period of time depending upon the speed of fluid pressure induced motion of the switch actuating means; means by which the pressure to which said switch actuating means and consequently its speed of pressure induced motion may be varied to cause advance of the saddle different distances; and means actuated by a part on the work table substantially at the times said work table reaches its extremes of reciprocatory movement for connecting said switch actuating means with a source of fluid under pressure.

2. In a metal working machine of the type having a base, a saddle mounted for reciprocatory movement on the base, a work table mounted for reciprocatory movement on the saddle but in a direction crosswise to the direction of saddle motion, and manually operable means for moving the saddle relatively to the base with an indexing motion, means for automatically advancing the saddle with an intermittent indexing motion in timed relation to reciprocatory movement of the work table to thereby enable the surface of a piece of work on the table to be acted upon progressively by a tool operating in a relatively fixed working zone comprising: power means in addition to said manually operable means for advancing the saddle; a member movable in response to fluid pressure; means momentarily actuated by said member during fluid pressure induced movement thereof for rendering said power means effective to advance the saddle a predetermined indexing distance; a source of fluid under pressure; means controlled by the work table upon reciprocation thereof to either of its extremes of movement for subjecting said member to fluid pressure to thereby effect movement of said member and consequently momentary operation of the power means; and safety means acting upon said momentarily actuated means during automatic control of the saddle to maintain the same potentially operative, said safety means being operable in the absence of fluid pressure such as when the saddle is to be manually indexed to prevent accidental actuation of said momentarily actuated means and consequently accidental operation of the power means.

3. In a metal working machine of the type having a base, a saddle mounted for reciprocatory movement on the base, a work table mounted for reciprocatory movement on the saddle but in a direction crosswise to the direction of saddle motion, and manually operable means for moving the saddle relatively to the base with an indexing motion, means for automatically advancing the saddle with an intermittent indexing motion in timed relation to reciprocatory movement of the work table to thereby enable the surface of a piece of work on the table to be acted upon progressively by a tool operating in a relatively fixed working zone comprising: a source of fluid pressure available only during automatic operation of the machine; power means for advancing the saddle including an electric motor; a switch having cooperating contacts engageable to complete an energizing circuit to the motor; means subjected to fluid pressure during automatic advancing of the saddle for maintaining said switch contacts in cooperating relationship and operable in the absence of fluid pressure such as when the saddle is to be manually indexed for disrupting the cooperating relationship between said contacts to thereby prevent accidental operation of the motor during manual indexing of the saddle; fluid pressure actuated means for closing the switch and for momentarily holding the switch contacts engaged to thereby effect advance of the saddle a predetermined distance; and means under the control of the work table rendered operative substantially at the times said work table reaches its extremes of reciprocatory movement for connecting said fluid pressure actuated means with the source of fluid under pressure to thereby effect momentary closure of the switch and advance of the saddle a predetermined distance with each reversal of the work table.

4. In a metal working machine of the type having a base, a saddle mounted for reciprocatory movement on the base, and a work supporting table mounted for reciprocation on the saddle but in a direction crosswise to motion of the saddle, said saddle being adapted to be intermittently advanced in one direction with an indexing motion in timed relation to reciprocation of the work table, a hydraulic control system for governing reciprocation of the work table and the intermittent indexing advance of the saddle comprising: a hydraulic circuit including a source of fluid under pressure; a double acting hydraulic cylinder in said circuit having its movable element connected with the work table to impart reciprocatory movement thereto in a direction depending upon the direction of fluid flow into the cylinder; a flow reversing valve actuated by the work table substantially at the time the work table reaches either of its extremes of motion for effecting reversal of the direction of fluid flow to the hydraulic cylinder and consequently travel of the table in a reverse direction; a second double acting hydraulic cylinder; a second hydraulic circuit connected with the source of fluid under pressure including said reversing valve whereby the reversing valve effects reciprocation of the movable element of said second hydraulic cylinder in consequence to reciprocation of the work table; power means for advancing the saddle; and means controlled by the movable element of said second designated cylinder during a portion of its reciprocatory movement in either direction for momentarily rendering the power means effective to thereby cause indexing advance of the saddle a predetermined distance.

5. In a metal working machine of the type having a base, a saddle mounted for reciprocatory movement on the base, and a work supporting table mounted for reciprocation on the saddle but in a direction crosswise to motion of the saddle, said saddle being adapted to be intermittently advanced in one direction with an indexing motion in timed relation to reciprocation of the work table, a hydraulic control system for governing reciprocation of the work table and the intermittent indexing advance of the saddle comprising: a hydraulic circuit including a source of fluid under pressure; a double acting hydraulic cylinder in said circuit having its piston connected with the work table to impart reciprocatory movement thereto in a direction depending upon the direction of fluid flow into the cylinder; a flow reversing valve actuated by the work table substantially at the time the work table reaches either of the extremes of motion for effecting reversal of the direction of fluid flow to the hydraulic cylinder and consequently travel of the table in a reverse direction; a second double acting hydraulic cylinder having a piston reciprocable therein; a second hydraulic circuit connected with the source of fluid under pressure including said reversing valve whereby the reversing valve effects reciprocation of the piston of said second hydraulic cylinder in consequence to reciprocation of the work table; power means for advancing the saddle including an electric motor; a normally open switch for connecting the motor with a source of E. M. F.; means in said second circuit for regulating the flow of fluid to said second cylinder to thereby enable adjustment of the speed of reciprocatory movement of its piston; and a connection between the piston of said second cylinder and the switch by which the switch is momentarily closed during a portion of piston movement in either direction in said second cylinder for a period of time depending upon the speed of piston travel in said second cylinder.

6. In combination: an electric circuit; a hydraulic circuit; a switch for controlling said electric circuit; a double acting hydraulic cylinder connected in said hydraulic circuit having a piston reciprocable therein in response to the alternate application of fluid pressure to the opposite ends of the cylinder; means actuated by the piston during movement thereof in either direction for actuating the switch and for holding the same in its actuated position for a period of time depending upon the speed at which the piston travels; and means in said hydraulic circuit for regulating the pressure alternately applied to the opposite ends of the cylinder to thereby afford adjustment of the speed at which the piston travels.

7. In a metal working machine of the type having a base, a saddle member mounted for reciprocatory movement on the base, a work supporting member mounted for reciprocatory movement on the saddle member but in a direction crosswise to the direction of saddle motion, means for automatically advancing one of said members with an intermittent indexing motion in timed relation to reciprocatory movement of the other of said members to thereby enable the surface of a piece of work on the work supporting member to be acted upon progressively by a tool operating in a fixed working zone, comprising: a hydraulic cylinder, the movable element of which is connected with one of said members to reciprocate the same upon the alternate application of fluid pressure to the opposite ends of said cylinder; an electric motor for imparting indexing motion to the other of said members; a second hydraulic cylinder; means operable by the movable element of the second hydraulic cylinder during motion thereof in either direction for rendering the electric motor operative; and means for supplying fluid under pressure from a common source alternately to the opposite ends of both of said cylinders including a reversing valve operated by said first designated member as it approaches its extremes of reciprocatory movement.

8. In a metal working machine of the type having a base, a saddle member mounted for reciprocatory movement on the base, a work supporting member mounted for reciprocatory movement on the saddle member but in a direction crosswise to the direction of saddle motion, means for automatically advancing one of said members with an intermittent indexing motion in timed relation to reciprocatory movement of the other of said members to thereby enable the surface of a piece of work on the work supporting member to be acted upon progressively by a tool operating in a fixed working zone, comprising: a hydraulic cylinder, the movable element of which is connected with one of said members to reciprocate the same upon the alternate application of fluid pressure to the opposite ends of said cylinder; an electric motor for imparting indexing motion to the other of said members; a switch for controlling operation of the motor; a second hydraulic cylinder; means operable by the movable element of the second hydraulic cylinder during motion thereof in either direction for closing the switch and for holding the switch closed for a period of time depending upon the pressure applied to said second hydraulic cylinder for rendering the electric motor operative for a predetermined period of time; means for supplying fluid under pressure from a common source alternately to the opposite ends of both of said cylinders including a reversing valve operated by said first designated member as it approaches its extremes of reciprocatory movement; and means by which the pressure applied to said second hydraulic cylinder may be varied to enable indexing advance of said other member different distances.

9. In combination: an electric circuit; a hydraulic circuit; a switch movable to open and closed positions and connected in said electric circuit to control the same; a double acting hydraulic cylinder connected in said hydraulic circuit so that its movable element reciprocates in response to the alternate application of fluid pressure to the opposite ends of the cylinder with a speed determined by the pressure applied to the cylinder; cam means on the movable member of said hydraulic cylinder cooperable with the switch during pressure induced motion of said member to effect actuation of said switch to its closed position and for holding the switch closed for a period of time depending upon the speed of pressure induced motion of said member; and means for regulating the speed at which said member moves so as to enable adjustment of the period during which the switch is maintained in its closed position rendering the electric circuit operative.

10. In combination: an electric circuit; a hydraulic circuit; a switch for controlling said electric circuit; a double acting hydraulic cylinder connected in said hydraulic circuit and having its movable member reciprocable in opposite direction throughout a predetermined range of motion in response to the alternate applictaion of fluid pressure to said cylinder and at a speed determined by the degree of pressure to which said member is subjected for momentarily actuating the switch and for holding the switch in its actuated position for a period of time depending upon the speed at which said member moves through its range of motion; and means for regulating the pressure applied to said cylinder so as to enable adjustment of the speed of fluid pressure induced motion of said member and consequently the period of time the switch is held in its actuated position.

JOHN A. HARRINGTON.